United States Patent
Schuchman et al.

(10) Patent No.: US 9,600,283 B2
(45) Date of Patent: *Mar. 21, 2017

(54) SINGLE INSTRUCTION FOR SPECIFYING A SUBSET OF REGISTERS TO SAVE PRIOR TO ENTERING LOW-POWER MODE, AND FOR SPECIFYING A POINTER TO A FUNCTION EXECUTED AFTER EXITING LOW-POWER MODE

(71) Applicant: INTEL CORPORATION, Santa Clara, CA (US)

(72) Inventors: Ethan Schuchman, Santa Clara, CA (US); Hong Wang, Santa Clara, CA (US); Chris Weaver, Austin, TX (US); Belliappa M. Kuttanna, Austin, TX (US); Asit Mallick, Saratoga, CA (US); Vivek K. De, Beaverton, OR (US); Per Hammarlund, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/854,082

(22) Filed: Sep. 15, 2015

(65) Prior Publication Data

US 2016/0004533 A1 Jan. 7, 2016

Related U.S. Application Data

(63) Continuation of application No. 14/286,536, filed on May 23, 2014, now Pat. No. 9,164,764, which is a
(Continued)

(51) Int. Cl.
*G06F 9/30* (2006.01)
*G06F 1/32* (2006.01)
*G06F 9/46* (2006.01)

(52) U.S. Cl.
CPC ........ *G06F 9/30083* (2013.01); *G06F 1/3203* (2013.01); *G06F 1/324* (2013.01);
(Continued)

(58) Field of Classification Search
CPC .......................... G06F 1/3246; G06F 9/30083
(Continued)

(56) References Cited

U.S. PATENT DOCUMENTS 5,414,864 A 5/1995 Koizumi
5,682,531 A 10/1997 Nakamura
(Continued)

OTHER PUBLICATIONS

IBM Technical Disclosure Bulletin NA9008234, Aug. 1990, 4 pages.

*Primary Examiner* — David J Huisman
(74) *Attorney, Agent, or Firm* — Trop, Pruner & Hu, P.C.

(57) ABSTRACT

Methods and apparatuses for reducing power consumption of processor switch operations are disclosed. One or more embodiments may comprise specifying a subset of registers or state storage elements to be involved in a register or state storage operation, performing the register or state storage operation, and performing a switch operation. The embodiments may minimize the number of registers or state storage elements involved with the standby operation by specifying only the subset of registers or state storage elements, which may involve considerably fewer than the total number of registers or state storage or elements of the processor. The switch operation may be switch from one mode to another, such as a transition to or from a sleep mode, a context switch, or the execution of various types of instructions.

19 Claims, 5 Drawing Sheets

Related U.S. Application Data continuation of application No. 11/904,395, filed on Sep. 27, 2007, now Pat. No. 8,762,692.

(52) U.S. Cl.
CPC .......... *G06F 1/3234* (2013.01); *G06F 1/3237* (2013.01); *G06F 1/3246* (2013.01); *G06F 1/3265* (2013.01); *G06F 1/3268* (2013.01); *G06F 1/3296* (2013.01); *G06F 9/3012* (2013.01); *G06F 9/3013* (2013.01); *G06F 9/30043* (2013.01); *G06F 9/30105* (2013.01); *G06F 9/461* (2013.01); *Y02B 60/1217* (2013.01); *Y02B 60/1221* (2013.01); *Y02B 60/1242* (2013.01); *Y02B 60/1246* (2013.01); *Y02B 60/1285* (2013.01); *Y02B 60/32* (2013.01)

(58) Field of Classification Search
USPC .................. 712/228; 713/320, 323; 718/108
See application file for complete search history.

(56) References Cited

U.S. PATENT DOCUMENTS

| | | |
|---|---|---|
| 5,842,028 A | 11/1998 | Vajapey |
| 5,878,264 A | 3/1999 | Ebrahim |
| 5,974,512 A | 10/1999 | Chiba |
| 5,999,730 A | 12/1999 | Lewis |
| 6,061,711 A | 5/2000 | Song et al. |
| 6,131,166 A | 10/2000 | Wong-Insley |
| 6,205,543 B1 | 3/2001 | Tremblay et al. |
| 6,209,085 B1 | 3/2001 | Hammond et al. |
| 6,408,325 B1 | 6/2002 | Shaylor |
| 6,438,708 B1 | 8/2002 | Shinichi et al. |
| 6,440,073 B1 | 8/2002 | Robinson et al. |
| 6,553,487 B1 | 4/2003 | Sukonik et al. |
| 6,748,548 B2 | 6/2004 | Bormann et al. |
| 6,968,469 B1 * | 11/2005 | Fleischmann ......... G06F 1/3228 365/228 |
| 7,194,644 B2 | 3/2007 | Durand et al. |
| 2006/0149940 A1 | 7/2006 | Mukherjee |
| 2008/0133898 A1 | 6/2008 | Newburn et al. |
| 2009/0172439 A1 | 7/2009 | Cooper et al. |

* cited by examiner

SINGLE INSTRUCTION FOR SPECIFYING A SUBSET OF REGISTERS TO SAVE PRIOR TO ENTERING LOW-POWER MODE, AND FOR SPECIFYING A POINTER TO A FUNCTION EXECUTED AFTER EXITING LOW-POWER MODE

This application is a continuation of U.S. patent application Ser. No. 14/286,536, filed May 23, 2014, now U.S. Pat. No. 9,164,764, issued Oct. 20, 2015, which is a continuation of U.S. patent application Ser. No. 11/904,395, filed Sep. 27, 2007, now U.S. Pat. No. 8,762,692, issued Jun. 24, 2014, the content of which is hereby incorporated by reference.

FIELD

The embodiments herein generally relate to the field of computing apparatuses. More particularly, the embodiments relate to methods and apparatuses for reducing power consumption of processor standby operations.

BACKGROUND

Performance of computing apparatuses may be increased by increasing the operating frequencies and by increasing the number of components, such as transistors, in circuits of the apparatuses. To keep the circuit sizes manageable, designers have reduced or scaled down the size of the circuit components so that larger numbers of devices fit within smaller per unit areas. Today it is not uncommon to find advanced computer system chips that contain millions, even billions, of transistors. This increased density, however, has created numerous problems. One problem is power consumption. Since each electronic circuit component consumes a minute amount of power while operating, circuits with increased numbers of such circuit components generally consume larger quantities of power. Consequently, designers are continually looking for ways to reduce power consumption. Reducing power consumption may provide several benefits. For example, battery lives of mobile devices will generally last longer. When many computing devices are amalgamated in close proximity, such as with large-scale server systems, reducing power consumption may significantly reduce electricity costs, reduce heat generation, reduce cooling costs associated with removing the heat generation, and even extend the life cycles of the computing apparatuses.

Modern computing apparatuses reduce power consumption by clock gating unused structures, especially in processors. While such clock gating techniques may reduce dynamic power consumption, static power consumption remains an issue. In analyzing the problem of static power, one may note that processors may handle workloads in bursts. High performance may be needed for only short periods of time. In the remaining amount of time processors may be idle and only periodically perform limited tasks such as checking for new work, or maintaining network connections. To achieve low energy consumption during idle times, modern processors may power down (sleep) unused cores. In other words, modern processors may switch one or more cores from a high-power mode to a low-power mode. When powering circuits down or up, within a computing apparatus, such as a microprocessor, processing state information may be saved or restored to or from a non-volatile or volatile storage area.

As another power reduction technique, processors may turn on more sections or structures in various divisions of sleep levels. Consequently, more state information may be saved and restored. Unfortunately, unpredictable workloads that come in bursts may cause processors to spend much of their time repeatedly saving and restoring processor and operating system (OS) state upon entering and exiting sleep state, and repeatedly saving and restoring process state for other types of standby operations, such as application context switches. While the power usage in low power states can be relatively low, computing apparatuses employing such techniques may nonetheless still consume significant amounts of energy entering and exiting the low-power states because of the repeated saving and restoring of processor state. For example, some state save and restore mechanisms provided by some processors assume the worst case of processor state usage and save and restore relatively large amounts of state, such as 8 kilobyte (KB) of state per activation, regardless how much state remains intact from the last standby activation. Additionally, many standby operations of many processors require exclusive OS support for activation.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION

Figure 1:
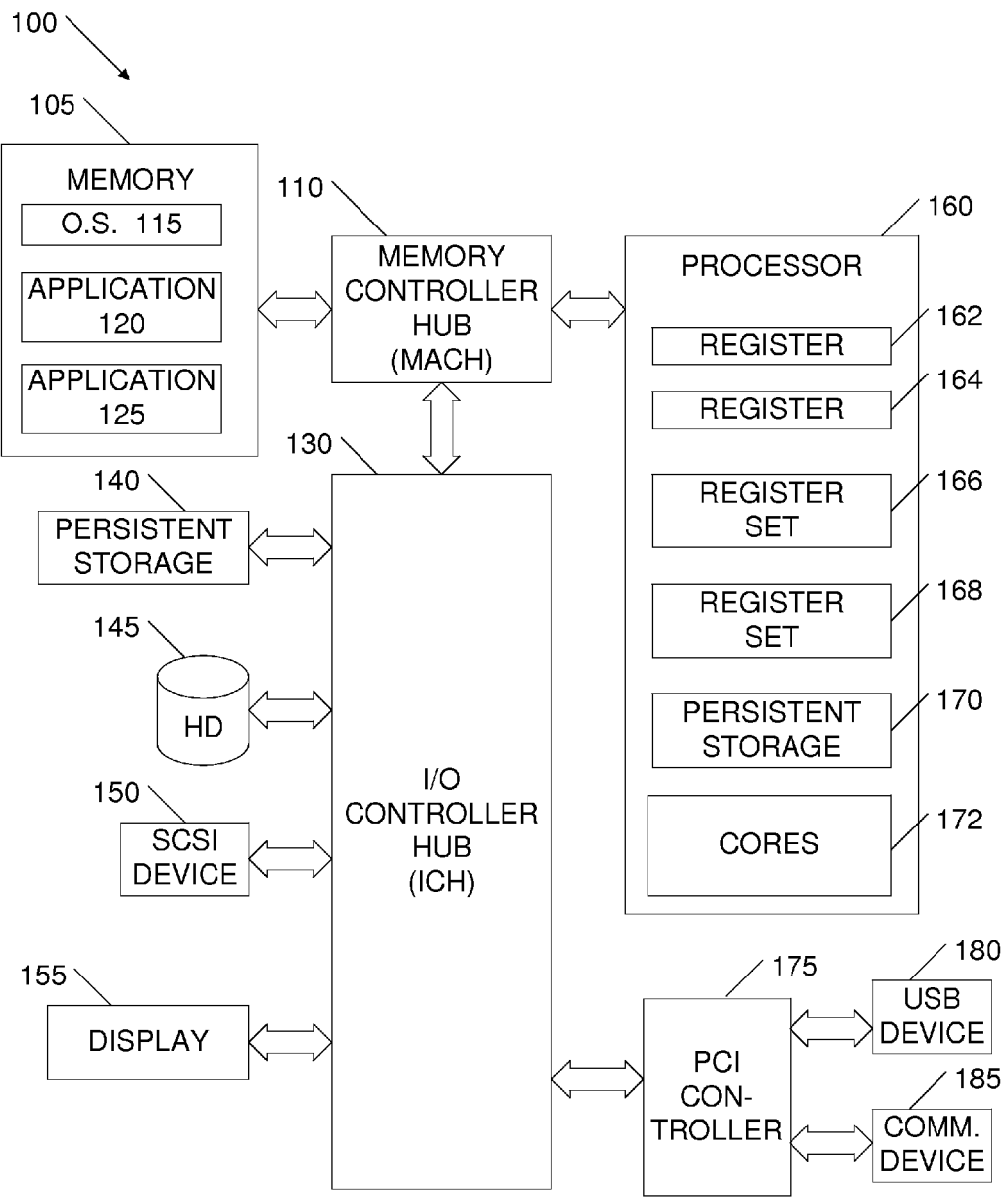
FIG. 1 depicts an apparatus which may employ various power saving techniques for standby operations, comprising a processor, memory, a memory controller hub, an Input/Output (I/O) controller hub, a display, and a communication device.

The following is a detailed description of embodiments depicted in the accompanying drawings. The specification is in such detail as to clearly communicate the embodiments. However, the amount of detail offered is not intended to limit the anticipated variations of embodiments; but on the contrary, the intention is to cover all modifications, equivalents, and alternatives consistent with the spirit and scope of the embodiments as defined by the appended claims.

At least one embodiment includes specifying a subset of registers to be involved in a register save or a register restore operation. Upon specifying the subset of registers, the embodiment may then involve performing the register save or the register restore operation and performing a processor switch operation, such as a switch of a processor core from one power mode or state to another or a context switch. Advantageously, at least one embodiment may include reducing a number of registers involved with the processor switch operation. In one embodiment a processor switch operation may include switching a processor or processor core from a high-power mode or state to a low-power state, such as a "sleep" state. In some embodiments, a processor switch operation may include switching processor context information and/or performing an operation to pause processor operation, such as a "Pause" instruction or "MWAIT" instruction. In other embodiments, a processor switch operation may include other processor operations having the effect of reducing power consumption. Various embodiments may include specifying a function pointer to allow the processor to jump to a handler function. Some embodiments include restoring states of registers of the subset to allow the execution of the handler to check for additional work for the processor. Other embodiments include initiating a second sleep operation upon the determination that the processor has no additional work. Even further embodiments include restoring full processor state upon determination that the processor has additional work.

Various embodiments comprise specifying a register use set for the subset of registers. For example, in one embodiment an operating system or an application may specify that the information contained in a number of architectural registers, or register use set, may be saved or restored to/from persistent storage. Various other embodiments may comprise specifying a class of registers instead of a register use set. Some embodiments comprise saving and/or restoring information stored within a subset of registers to/from a storage area, such as system memory or non-volatile memory, before/after putting a processor into a reduced power mode. In some embodiments, one or more metadata bits may be used to specify a subset of registers whose state is to be saved/restored. For example, in one or more of the embodiments metadata may be a bit or group of bits stored within a register or group of registers which describe the data stored in the register. While some embodiments comprise saving states of registers specified by the metadata bits, other embodiments comprise restoring states of the registers. Various embodiments may save/restore information of a subset of registers in conjunction with an operation, such as an MWAIT operation or a context switch operation, based on states of metadata bits of the registers. For example, one or more embodiments may specify the subset of registers to be involved in the operation by setting one or more bits in the subset of registers, wherein the subset comprises a limited number of a total set of registers. The embodiments may examine the states of metadata bits for the subset, and potentially examine the states of metadata bits for other registers in the set, and perform the save/restore operation for information of registers which have their metadata bits set.

Embodiments may comprise control logic to switch from a first mode of operation to a second mode of operation. For example, the control logic may switch from a low-power mode to a high-power mode, and vice-versa. Alternatively, in one or more embodiments, the different modes may comprise different processor power states, such as a sleep state or one of various levels of wake states. In even further embodiments, switching from the first and second modes of operation may comprise switching between different process threads or different applications, such as those involving context switches.

At least one embodiment has state storage to store state information of the first mode. In some embodiments, the state storage may comprise registers of a processor. In other embodiments, the state storage may comprise a memory element, such as static or dynamic random access memory, which may contain or store state information. At least one embodiment has persistent storage to store state information as the control logic performs the switch from the first mode to the second mode. One or more of the embodiments may save power by reducing the quantity of state information to be involved with saving state information to the persistent storage, restoring state information from the persistent storage, or both.

In one or more embodiments, persistent storage may comprise memory that retains the stored information during a processor switch operation, such as system memory or non-volatile memory. Embodiments may use a handler module to allow the processor to check for additional work when the processor switch operation is a conclusion of a sleep operation. Various embodiments specify registers for the register save or restore operation by specifying a register use set, by specifying a class of registers, or by setting one or more metadata bits.

Embodiments or portions thereof may be performed by complementary metal-oxide-semiconductor (CMOS) circuits ("hardware") or by a machine-readable medium having stored thereon a set of instructions, which when executed by a machine, such as a processor, cause the underlying hardware to perform one or more methods prescribed by the instructions. In one embodiment, the instructions, when executed by a processor, cause the processor to reduce power consumed by the processor. For example, at least one embodiment includes instructions prescribing operations, including specifying a subset of registers for a register operation, such as saving or restoring state information of registers, performing the register operation, and performing a portion of a standby operation. Embodiments may specify a subset of registers to minimize the number of registers involved with the processor switch operation. In one embodiment, a processor switch operation may include a sleep operation, a context switch operation, or an MWAIT operation.

Turning now to the drawings, FIG. 1 shows a system 100, which may comprise part of a microprocessor or computer system, which may employ various power saving techniques for processor switch operations, such as a standby operation or a switch between two or more modes, according to one embodiment. System 100 may be included in or be part of an AOAC computing device or an Ultra Mobile Device (UMD). For example, system 100 may be part of a portable computing device such as a personal digital assistant (PDA), having support for wireless communications, or a cellular telephone. Alternatively, a non-portable AOAC computing device, such as a rack-mounted server, may include system 100. In even further embodiments, system 100 may be included in a computing device that is not always on or always connected but rather one where power conservation may be desirable, such as a laptop or a notebook computer. The above examples are meant to be illustrative and not exhaustive.

System 100 may have a processor 160. In the embodiment depicted in FIG. 1, processor 160 comprises multiple cores 172. For example, processor 160 may comprise a dual core, quad core, or other multiple-core processor. Processor 160 may have architectural hardware to perform, and allow software to invoke, one or more of the power saving techniques described herein. In other words, various embodiments may have hardware to decode and execute instructions described herein, or instructions or commands similar to the ones described, which enable the power saving techniques. Additionally, one or more of cores 172, if present in an embodiment, may also have hardware to perform and support the power saving techniques.

Processor 160 may be coupled to a memory controller hub (MCH) 110. Processor 160 may execute program instructions of an operating system (OS) 115 as well as instructions of user applications, such as application 120, in memory 105 by interacting with MCH 110. For example, application 120 may comprise instructions for a communications application monitoring network communication activity in a server. MCH 110 may also couple processor 160 with an I/O controller hub (ICH) 130. Processor 160 may execute multiple applications. For example, processor 160 may execute application 120 and application 125. Application 120 may be a web browser allowing a user of system 100 to surf the Internet. Application 125 may comprise another type of program, such as an e-mail program, or a type of productivity application such as Microsoft™ Excel™ or Microsoft™ Word. Processor 160 may execute both application 120 and application 125 in a manner that appears simultaneous to a user of system 100, by multithreading. For example, processor 160 may execute, in an alternating fashion, threads of application 120 and application 125. For one thread, processor 160 may execute a group of program instructions and/or commands for application 120, perform operations based on the information of registers, such as registers 162 and 164, and place results of the operations into cache, into memory 105, or even saved to hard drive 145.

Upon retiring a number of instructions for the thread of application 120, processor 160 may then switch to a thread of application 125. That is to say, under control of OS 115, processor 160 may perform a context switch. In performing the context switch, OS 115 may save state information of one or more registers of processor 160 to cache or memory 105, such as the information of register 162, register 164, and register set 166. After saving the information of the registers, OS 115 may cause processor 160 to load or restore previously saved state information for the thread of application 125, which may comprise information of registers 162 and 164, and register set 166. Upon restoring the information back to the registers, OS 115 may cause processor 160 to start executing instructions of the thread for application 125.

One may note that the discussions for various embodiments may generally refer to the term "register", when referring to a part of a processor, processor core, or other processing logic that may contain state information. While some embodiments may only involve saving and/or restoring state information of registers, other embodiments may save and/or restore information of other types of elements, such as static or dynamic random access memory devices built in our coupled to the processor, core, logic, etc. The term "register" is used throughout the discussions for the sake of consistency and illustration. However, for instances of various alternative embodiments, the term "state storage" or "state storage location" may sometimes be substituted.

ICH 130 may allow processor 160 to interact with external peripheral devices, such as keyboards, scanners, data storage devices, and communications devices. For example, system 100 may save and restore data via hard drive 145. Hard drive 145 may be one of several data storage devices, such as a parallel Advanced Technology Attachment (ATA) hard drive, a Serial ATA (SATA) hard drive, a compact disc recordable (CD-R) drive, a CD rewritable (CD-RW) drive, a digital versatile disc (DVD) drive, a tape drive, or other storage device.

In one or more alternative embodiments, system 100 may be adapted or arranged to have architectural hardware or control logic to save state, such as the information of a limited number of registers or other state storage elements of processor 160, to hard drive 145. For example, processor 160 may execute a series of standby instructions and/or operations that place one or more components of system 100 into a sleep mode, such as by placing processor 160 into a lower power state and shutting down display 155 and hard drive 145, or a hibernation mode, such as by saving information of applications 120 and 125, as well as information of OS 115, to hard drive 145 and shutting down system 100. Processor 160, via MCH 110 and ICH 130, may save the contents of memory 105, and save the states of register 162, register 164, and even the states of registers in the other cores 172 to hard drive 145 or other non-volatile storage area such as flash memory (not shown). Upon saving the information and the states of the registers, system 100 may go into a low-power mode, such as the sleep or hibernation mode described above, and monitor a component of system 100, such as a universal serial bus (USB) device 180 or a communication device 185, for some type of activity. For example, system 100 may wait for the depression of a power button, mouse or touchpad activity, network communication activity, or some other activity. Upon detecting the activity, system 100 may conclude the sleep or hibernation mode, and restore the information and states back to memory 105, register 162, register 164, and the other registers of cores 172. System 100 may also be coupled to other types of hardware devices, such as small computer systems interface (SCSI) device 150. For example, SCSI device 150 may comprise a SCSI hard disk drive or a SCSI Redundant Array of Independent Disks (RAID). Similar to hard drive 145, SCSI device 150 may be used to store and retrieve states of registers 162 and 164, register sets 166 and 168, state of cores 172, and information of memory 105.

The system 100 may be configured to present information, using means such as application windows, to a user via a display 155 device. In some embodiments, display 155 may comprise a cathode-ray-tube (CRT) monitor or a liquid crystal display (LCD) screen or a thin-film transistor flat panel monitor. For example, in one or more embodiments display 155 may comprise a small LCD of a cellular telephone. In addition to display 155, processor 160 may interact with other types of devices via a Peripheral Component Interconnect (PCI) controller 175. For example, system 100 may comprise an AOAC server that uses PCI controller 175 to continually monitor communication device 185 for network activity. After a period of inactivity, system 100 may initiate a processor switch operation, such as an MWAIT operation, a context switch, or a sleep operation. Upon detecting network activity, system 100 may conclude the standby operation and resume normal operation.

As noted above, system 100 may also have a universal serial bus (USB) device 180. In some embodiments, USB device 180 may comprise one or more data storage devices which are used passively. For example, USB device 180 may comprise a flash drive containing user files. Processor 160 may work in conjunction with ICH 120 to store and retrieve the files and display them for the user via display 155, such as with a text file. Alternatively, in various embodiments, system 100 may actively interface with the USB device 180 to save and restore state. For example, the USB device 180 may comprise a USB hard drive wherein the system 100 may use the drive to save and restore state, similar to the fashion described above for hard drive 145. In even further embodiments, the apparatus may monitor the USB device 180 for activity. For example, USB device 180 may comprise a modem. After a period of modem inactivity, system 100 may initiate a standby operation. Upon detecting modem activity, system 100 may conclude the standby operation.

While system 100 is shown to have numerous peripheral devices attached in the embodiment of FIG. 1, other embodiments may have different combinations of such hardware devices, such as only one or two of the devices. Additionally, system 100 may be coupled with other types of hardware not described, such as a sound card, a scanner, a printer, and other types of hardware devices. In such embodiments, system 100 may use one or more of the peripheral devices in various ways. In some of the embodiments, system 100 may monitor the peripheral devices for activity and, based on the activity, perform a processor switch operation. In other embodiments, system 100 may use the devices in the process of saving and restoring state. In even further embodiments, such peripheral devices may be relatively uninvolved with the standby operations, such as lack of use whenever system 100 initiates a sleep operation. As one may readily conclude based on the various alternative embodiments described, system 100 depicted in FIG. 1 is intended to provide an illustrative embodiment which may be varied in actual embodiments.

As mentioned above, system 100 may have hardware and associated control logic that allows software to conserve power. In one embodiment, system 100 may conserve power during a standby operation by exploiting the observation that many programs, both OS and applications, may use only a small subset of the processor state, such as the information of a limited number of registers of processor 160. Consequently, in one embodiment, system 100 may conserve energy, bandwidth, etc., by saving and restoring state & processor 160, or cores 172, that is needed and not saving and restoring state that is not modified or will not be read. In one embodiment, system 100 may save or restore a subset of state information stored in architectural register set 166 in order to conserve power during operation of system 100. In one embodiment, an OS or application running on the processor may specify which registers, group of registers, register classes (e.g., MMX, XMM, etc.) are to be saved and restored when going into a low-power mode (e.g., standby) or returning from a low-power mode based, at least in part, off of what state has changed from previous instances of the processor entering a low-power mode.

The subset of state information that system 100 may save and restore during the course of processing a standby operation may be less than a full set of architecture states representing the complete state of processor 160. For example, when the system 100 initiates a processor switch operation, system 100 may save the states of register 162, register 164, and register set 166 of processor 160 to persistent storage. In referring to persistent storage, various parts of the previous and following discussion may use the term to describe where system 100 may save and restore state information of processor 160. In this context, the term persistent storage may mean that the persistent storage only has to retain the state information across sleep periods. Such persistent storage may include "non-volatile" memory in one or more embodiments, but is not necessarily limited to non-volatile memory. In other words, the persistent storage may not retain stored information if power is removed from the storage component. For the various embodiments, therefore, persistent storage should not be confused with non-volatile memory. Different embodiments may store state information in one or more types of memory devices, such as static random access memory (SRAM), dynamic random access memory (DRAM), flash memory, a hard drive, or another type of memory device. For example, one embodiment may store state information in SRAM cache memory while another embodiment may store state information in a synchronous DRAM module.

Depending on the embodiment, the persistent storage may be internal to processor 160, such as persistent storage 170, or external to processor 160, such as persistent storage 140. Additionally, as noted before, the persistent storage used to store the state may comprise a data storage device, such as hard drive 145, SCSI device 150, or USB device 180, as examples. To enter and/or exit a low power mode, system 100 may not need to save and restore the states of remaining registers of processor 160, such as register set 168. Register set 168 may comprise most of the registers of processor 160. For example, assume that processor 160 is a single core processor such that cores 172 are not present. Processor 160 may have 132 architectural registers. Only saving and restoring approximately a portion of the contents of the registers when processor 160 goes into a standby or low-power state and restoring the same portion of the contents of the registers when processor 160 returns from standby state (or "wakes up") may reduce the number of state save/restore cycles processor 160 must perform, thereby reducing power of the processor and system 100.

In some embodiments, an OS 115 or an application, such as application 120 or 125, upon returning from a low-power mode, such as sleep, standby, or hibernation, may determine if any register state needs to be restored, and either restore state or return to the low-power mode when no state needs to be restored. For example, in some embodiments, state information may be saved or restored only when actually needed by OS 115, application 120, or application 125.

Because processor state information may change only slightly or relatively infrequently during operation of a program being executed by a processor, at least one embodiment of the invention may enable applications and operating systems to save and restore only a relatively small subset of processor state when the processor is entering or exiting a low-power state. For example, in one embodiment, an operating system or application may specify which registers or portions of registers are saved and restored when a processor executing the applications/operating systems is entering or returning from a low-power state. Power conservation techniques enabled by one or more embodiments of the invention may be illustrated by describing embodiments in conjunction with application register sets. Embodiments described herein may be used in conjunction with any low-power state of a processor or computing system, including, but not limited to, standard ACPI low-power states and proprietary low-power states implemented within a particular processor or computing environment. Furthermore, embodiments may be used in conjunction with any number of microprocessor architectures and instruction set architectures, including, but not limited to, an x86 architecture, a microprocessor without interlocked pipeline stages (MIPS) architecture, an advanced reduced instruction set computer (RISC) machine (ARM) architecture, a very long instruction word (VLIW) architecture, etc., regardless of instruction size (e.g., 32 bit, 64 bit, etc.).

In one embodiment, hardware and/or control logic of system 100 may allow programs to specify registers, register sets, or portions of registers or register sets within, or otherwise associated with, processor 160, such that only those registers, register sets, or portions thereof are to have their contents saved or restored during a transition of the processor to a low-power state or from a low-power state, respectively. In various embodiments, in an Instruction Set Architecture (ISA) associated with a processor may enable programs, such as applications or operating systems, to specify registers register sets, or portions thereof. For example, application 125 may specify that at any given time during its execution that application 125 never uses more than eight particular registers out of a total of 132 registers. In one embodiment, the processor may have hardware that allows it to decode and perform an instruction, such as one performing an instruction which may be referred to as "Sleep WithRegisterSet (bitmap* regset)". In at least one embodiment, application 125 or some other program may use the "Sleep WithRegisterSet" instruction to cause a processor 160 to enter a low-power state, such as a synchronous sleep standby state. With information provided within the "Sleep WithRegisterSet" instruction, application 125 may specify a list of registers, register sets, types, classes, or any portion thereof, that may store processor state information to maintain proper processor context during operation of the processor. In one embodiment, execution of an instruction, such as the "SleepWithRegisterSet" instruction, may cause specified registers, sets, classes, types or portions thereof to be saved to a storage location that retains the information when the processor enters a low-power state, which may be restored after the processor returns from the low-power state to some operating mode.

In one embodiment, specifying individual architectural registers by using the "SleepWithRegisterSet" instruction may allow saving and/or restoring of information in specific registers or other state storage elements, as opposed to saving and/or restoring information of a greater number of registers or state storage elements. In at least one embodiment, applications or an OS may specify registers, portions of registers, or other storage locations within a single instruction to prevent certain information contained within the registers or other storage locations from being saved, and therefore restored, when entering or exiting, respectively, a low-power mode, such as a standby mode. For example, application 125 may save and restore register 164 and register set 166, or some portion thereof, when processor 160 enters and exits, respectively, a low-power mode thereby preventing state information from being saved/restored that has not changed since the last low-power mode was entered/exited. In one embodiment, preventing unnecessary saving and restoring of processor state information that has not changed may reduce power consumption and increase performance in the processor and/or the computer system in which it is used.

In some embodiments, the above-described technique may be used in conjunction with instructions only available to certain software (vis-a-vis processor privilege levels, for example). For example, in one embodiment, techniques described herein may be available to instructions used by user-level software, such as applications or user-accessible portions of an operating system (i.e., non-kernel OS functions). An exemplary processor architecture that implements a current privilege level-3 (CPL3) instruction may be an "MWAIT" instruction, in one embodiment. Execution of an MWAIT instruction may place a processor 160 into a low power mode, such as a sleep mode. Furthermore, in one embodiment, execution of an MWAIT instruction may cause only the CPL3 states to be saved that have not changed since the last time the MWAIT instruction was executed. Similarly, only those states saved by executing the MWAIT instructions may be restored to machine registers when exiting a low power mode caused by the execution of the MWAIT instruction, thereby reducing the amount of processing cycles necessary to save/restore the CPL3 processor states, which may save power and decrease the time necessary to recover from low power modes, such as standby, sleep, etc.

In one embodiment, an application such as application 125 may specify a register bitmap to be used by a "Sleep-WithRegisterSet" instruction. However, in alternative embodiments a compiler of application 125 may automatically specify the register bitmap to be used by the "Sleep WithRegisterSet" instruction. In one embodiment, a compiler may determine all registers to be used by compiled code and generate appropriate bitmaps specifying registers or portions of registers whose contents are to be saved/restored (or prevented from being saved or restored) as a result of executing a low-power mode instruction, such as a "SleepWithRegisterSet" instruction, at compilation time. In some embodiments, the compiler may further reduce the architectural register footprint required for standby operations by choosing one or more optimal combinations of registers and algorithms. In even further embodiments, application 125 or the compiler may specify multiple register bitmaps to be passed to the "Sleep WithRegisterSet" instruction. For example, when the program is executing instructions from one portion of application 125, one register bitmap may be passed to the instruction, while another register bitmap may be passed to the instruction when the program is executing instructions from a second portion of the application.

Instead of, or in addition to, specifying specific registers or portions of registers to be saved or restored, groups of registers or register portions may be specified according to class, in some embodiments. In one embodiment, registers visible to user-level software (e.g., "architectural" registers) of processor 160, may be grouped into a class or partitioned into several classes. For example, in one embodiment, the architectural registers of processor 160 may be partitioned into a first class of 32-bit general purpose registers (GPR) comprising registers EAX, EBX, ECX, etc. A second class of registers may comprise control registers to store an instruction pointer register (EIP), a stack pointer register (ESP), a base pointer register (EBP), etc. A third class of registers may comprise special registers, such as those used by single instruction, multiple data (SIMD) instructions, such as those associated with multi-media extensions (MMX), or streaming SIMD extensions (SSE). In other embodiments, other register classes, including portions of those described above, may be specified.

In some embodiments, applications 120 and 125 may use all registers of one or more specific classes but not use, or at least relatively rarely use, no registers of another specific class or classes. Thus saving and/or restoring only classes that are relatively frequently used may improve power consumption and/or performance similar to that of embodiments specifying individual registers or sets of registers to be saved/restored when entering/exiting a low-power mode or performing a processor switch operation. In at least one embodiment, grouping registers into classes may allow one or more entire class of registers to be saved and/or restored when entering or exiting a low-power mode, such as standby mode, or performing a processor switch operation, such as executing a resume from system management (RSM) instruction or stopping execution with a halt instruction (HLT). For example, application 120 may specify register sets to save and restore general purpose integer registers, floating point/MMX registers, and data indexing registers. If application 120 normally uses, for example, ninety percent of all of the registers of those classes and no other registers of any other classes, specifying only those sets may achieve a significant portion of the power-saving and/or performance enhancements afforded by specifying individual registers.

In some embodiments, a processor may have one or more cores, each of which may be able to operate in their own respective power consumption modes or levels (e.g., "c-states"), associated with a given level of core activity or processing demand. For example, in one embodiment one core in cores 172 may operate in a first power consumption mode (e.g., "CΘ" state) during a certain operating period, in which all functional units, clusters, logic groups, etc., of the core are in an active state and able to function at a maximum performance level. Another core of cores 172 may operate in lower power consumption mode, (e.g., a "C1" state), in which the core(s) may operate at a lower voltage level and/or one or more core clocks have been turned off or slowed while maintaining data within one or more cache memories associated with the core(s), thereby allowing a relatively fast "wakeup" time for the core. In some embodiments, one or more cores of a processor 160, including registers 162 and 164 and register sets 166 and 168, may be placed into an even lower power consumption mode or modes (e.g., a "C6" state), in which all or most of the core clocks are stopped or significantly slowed and the voltage supply to the core is reduced below an operating level (including at least portions of any associated cache memories). In other embodiments, one or more processors or processor cores may be placed in other power consumption modes, each having a unique voltage level and/or clock frequency operating point.

In some embodiments, one or more power consumption states may be implemented using an instruction or group of instructions as part of a function, such as a "Sleep WithRegisterSet" instruction or function, which may be accessed as an OS system call or an ISA extension. In the case of a function accessed by an OS system call, application 125 may indicate to OS 115 that application 125 is yielding instruction execution to processor 160 and that application 125 needs the specified registers saved upon yielding instruction execution and restored upon resuming instruction execution for application 125.

Figure 2:
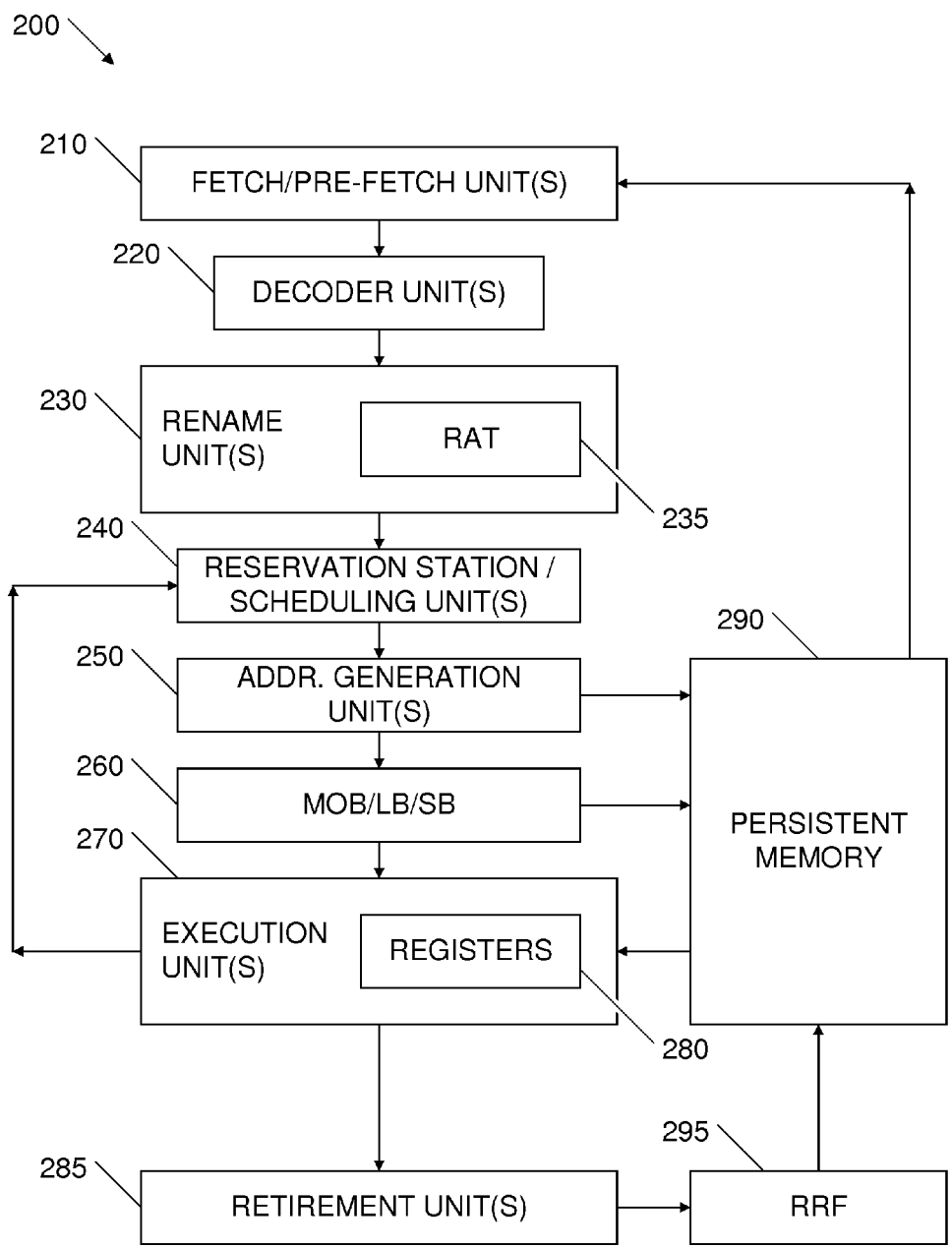
FIG. 2 shows an apparatus capable of performing power-efficient saves of register information for standby operations, comprising fetch, decode, rename, reservation, address generation, and execution units.

FIG. 2 illustrates techniques described above, according to at least one embodiment. In particular, FIG. 2 shows an apparatus 200 capable of performing power-efficient saves of processor state information, comprising numerous functional units. Apparatus 200 may perform the "Application Specified Register-Sets" and "Register Classes" techniques just described. Additionally, apparatus 200 may also perform the "Almost-Stateless Wakeup and Sleep" and "On-demand register save/restore" techniques to be described later.

Apparatus 200 may comprise a portion of a processor executing code of an operating system and one or more applications. One or more embodiments may allow software, such as an application, a process, or an operating system to save and/or restore state information of a subset of registers, where the saving/restoring of state information is associated with a processor switch operation. For example, the processor switch operation may comprise a switch from one mode of operation to another or a switch from executing the instructions of one thread or process to executing the instructions of another thread or process.

As noted above, FIG. 2 may illustrate a portion of processor, according to one embodiment, which is adapted to allow software instructions to save and restore processor state information for subsets of registers. In particular, apparatus 200 may comprise a portion of a pipelined processor having multiple stages, each stage comprising one or more of a fetch/pre-fetch unit 210, a decoder unit 220, a rename unit 230, and a reservation/scheduling unit 240.

Fetch/pre-fetch unit 210 may comprise an in-order unit that receives a stream of instructions from persistent memory 290. For example, persistent memory 290 may comprise SRAM cache memory. Additionally, depending on the embodiment, persistent memory 290 may also comprise DRAM memory coupled to apparatus 200 via a bus interface unit. In one or more embodiments, an application, process, or OS may save and/or restore state information of a subset of registers to/from persistent memory 290.

Decoder unit 220 may comprise an in-order unit that accepts instructions from fetch/pre-fetch unit 210 and decodes them into a series of micro-operations (uops) that represent dataflow of that instruction stream. Rename unit 230 may receive uops from decoder unit 220 and, based on the requirements of the uops, dynamically associate physical registers 280 of execution unit 270 with architectural registers of the predefined ISA for apparatus 200. To associate physical registers 280 with architectural registers, rename unit 230 may employ a register alias table (RAT) 235. Physical registers 280 may contain temporary values for instructions which have been completed but not yet retired, while architectural registers represented by RAT 235 may store committed values. In one embodiment, apparatus 200 may execute instructions from an application or an operating system which saves or restores state information of one or more registers associated with RAT 235 to persistent memory 290, wherein the save/restore is associated with an operational switch of apparatus 200. For example, apparatus 200 may execute instructions that cause apparatus 200 to stop instruction execution during a first mode of operation and enter a second mode of operation, a low-power operating state, until occurrence of an event or class of events, such as executing instructions associated with an MWAIT, MONITOR, HLT, PAUSE, SYSCALL, SYSEXIT, or other instructions.

In one or more embodiments, apparatus 200 may then add status information to the uops processed by rename unit 230 and enter them into an instruction pool, wherein the instruction pool may comprise an array of content addressable memory referred to as a reorder buffer (ROB). Reservation/scheduling unit 240 may select uops from the instruction pool depending on their statuses. For example, reservation/scheduling unit 240 may determine that a uop has all of its operands and that the necessary execution unit to process the uop is available. If reservation/scheduling unit 240 determines that a uop does not have all of its operands, such as receiving a miss from one or more caches of persistent memory 290, reservation/scheduling unit 240 may send the uop to address generation unit 250 and memory ordering buffer (MOB) 260 while the miss is refilled or accessed from other memory, such as DRAM memory of persistent memory 290. Address generation unit 250 may generate target linear addresses corresponding to load and store operations while MOB 260 may maintain a list of active memory operations and suspend processing of uops waiting on cache refills until the refills have arrived.

As alluded to, apparatus 200 may dispatch uops to execution unit 270 according to operand availability and execution unit resource availability. Retirement unit 285 may look for uops that have been executed and can be removed from the instruction pool. Based upon the original program order, retirement unit 285 may write the results of the uop executions to a retirement register file (RRF) 295. In one or more embodiments, apparatus 200 may perform a processor operation, such as context switch or a switch to a low-power operating mode, by executing instructions of an operating system or an application. Apparatus 200 may perform the processor operation upon retiring a uop instruction and writing the results to RRF 295. In conjunction with the processor operation, apparatus 200 may, in one or more embodiments, execute instructions from the operating system or application which saves or restores state information of one or more registers associated with RRF 295 to persistent memory 290. In addition to saving/restoring the state information of RRF 295 for the processor operation, apparatus 200 may also save/restore other state information, such as information of physical registers 280 and/or RAT 235.

To conserve power associated with a register save or restore operation, one embodiment of apparatus 200 may allow the operating system, application, or process to specify a number of registers that is less than the total number of registers which might otherwise be saved or restored. For example, apparatus 200 may provide architectural hardware support, or control logic, which allows the OS or application to save a subset or class of registers, such as physical registers 280 or RAT 235. For example, an operating system may specify that only 12 registers of registers 280, for which the total number of registers in registers 280 may comprise more than one hundred registers depending on the embodiment, be restored upon the conclusion of a context switch between threads.

In one embodiment apparatus 200 may perform a save operation for state information of one or more of a subset of registers of RRF 295, a subset of registers 280, and a subset of registers of RAT 235 to persistent memory 290, upon the execution of an MWAIT instruction of apparatus 200. Alternatively, for the sake of an additional example, apparatus 200 may perform a restore operation of previously saved state information from persistent memory 290 to a subset of registers RRF 295, a subset of registers 280, and a subset of registers 235, upon the execution of a context switch between two applications. Stated alternatively, apparatus 200 may execute a series of uops associated with a processor switch operation, via the fetch unit 210, decode unit 220, rename unit 230, execution unit 270, etc., wherein executing one or more of the uops causes apparatus 200 to save or restore state information for a subset or limited number of registers of registers of RRF 295, registers 280, and RAT 235 to/from persistent memory 290. The processor switch operation may comprise the initiation or conclusion of a sleep operation, such as the switch from a core sleep state of C6 to a core sleep state of C5.

As described, apparatus 200 may save/restore the states of register state information to persistent storage 290. In some embodiments, persistent storage 290 may comprise SRAM located in close proximity, such as in a chip package of a processor like persistent storage 170 shown in FIG. 1. In alternative embodiments, persistent storage 290 may comprise non-volatile memory locate away from apparatus 200. For example, persistent storage 290 may be located in a different area of a system comprising of apparatus 200, such as persistent storage 140 shown in FIG. 1, which may comprise flash memory or a type of battery-back memory coupled to apparatus 200. In even further embodiments, persistent storage 290 may comprise a medium of a data storage device, such as magnetic media of hard drive 145, flash memory structures of USB device 180, or CD/DVD medium of a data storage disc.

As previously mentioned, AOAC applications may spend significant operational time idle and monitoring activity within the computer system in which they execute. Consequently, one or more embodiments may implement handler functions to perform monitoring tasks, in which only portions of state is saved and restored when entering or exiting low-power modes, respectively. For example, when a handler detects activity within a computer system, such as the one in FIG. 1, processor 160 may restore state information to the processor according to the techniques described and return control to a program, such as application 120, that caused the processor to enter a low-power mode, One or more embodiments may have hardware to decode and execute instructions that place all or part of a system or an apparatus, such as a processor or processor core, into a low-power mode, yet still periodically check for work. More specifically, in some embodiments, a specific instruction, such as a "SleepWithRegister SetsAndHandler(bitmap* regset, func* handler)" instruction, may be used to enable a handler to place processing resources, such as a processor core, into a reduced power state. In one embodiment, the "SleepWithRegisterSetsAndHandler(bitmap* regset, func*handler)" may perform a similar function to the "Sleep WithRegisterSets" instruction, but additionally specify a function pointer to be executed upon return from a low-power mode. The specified register sets (bitmap* regset) may list all the registers that the handler expects to have restored before the handler is executed. A system or apparatus, such as system 100 or apparatus 200, may save all state of a processor or processor core upon initiating the low-power mode. For example, in one embodiment, the contents of registers 162 and 164 as well as the contents of register sets 166 and 168 may be saved, assuming these registers are all the registers of processor 160, or at least all of the processors for one of the cores of processor 160.

In at least one embodiment, after a system or apparatus has saved all state of the processor and initiated a low-power mode by executing the "SleepWithRegisterSetsAndHandler (bitmap* regset, func* handler)" instruction, a "RestoreAndReturn ( )" instruction may be called by the handler to restore the contents of registers saved as a result of executing the "Sleep WithRegisterSetsAndHandler(bitmap* regset, func* handler)" instruction and return control back to a handler that called the "SaveWithRegisterSetsAndHandler" instruction, or the program that called the handler. Alternatively or in addition, in one embodiment, activity may be monitored after the processing resource(s) has/have been placed in a low-power mode by executing another instruction, such as a "ContinueSleepWithRegisterSetsAndHandler ( )" instruction, which enables activity to be monitored by a program while a processing resource is in a low-power mode. In other words, an apparatus or system may have hardware to decode and perform these instructions, or instructions similar to them. In one embodiment, a combination of the "SleepWithRegisterSetsAnd Handler(bitmap* regset, func* handler)", "ContinueSleepWith RegisterSetsAndHandler( )", and "RestoreAnd Return ( )" instructions may allow a system or apparatus to cause a processor to enter a low-power mode with the same handler and register sets of a call to a "Sleep WithRegisterSetsAndHandler" instruction, as illustrated in FIG. 3.

Figure 3:
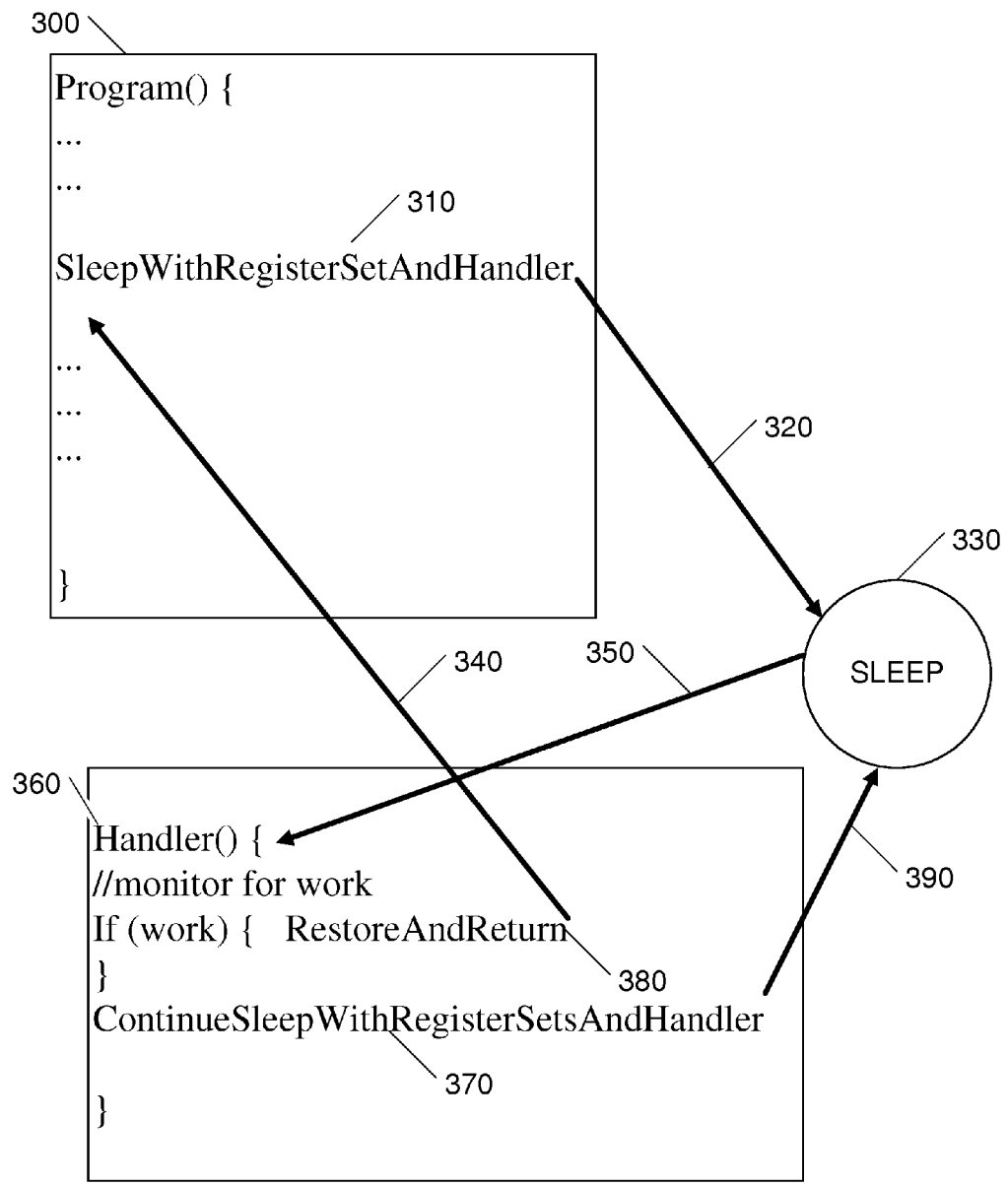
FIG. 3 illustrates a technique for reducing power of a sleep operation by using a function handler, according to one embodiment.

FIG. 3 illustrates one embodiment employing "SleepWithRegisterSetsAnd Handler(bitmap* regset, func* handler)", "ContinueSleepWith RegisterSetsAndHandler( )", and "RestoreAndReturn( )" instructions. Whenever a program 300, such as applications 120 or 125 or OS 115, wishes to enter a sleep state, program 300 may issue or execute a "Sleep WithRegisterSetAndHandler" instruction 310. In executing the instruction, program 300 may pass a handler pointer and a bitmap specifying all the registers needed by only the handler and not any registers of any other reachable code.

The processor may then enter (element 320) sleep state 330, which may be C6, C3, etc., and sleep until woken. Instead of returning directly to where it entered the sleep state, the processor may instead jump (element 350) to the Handler function 360 and restore the registers specified in the register set. Next, the handler may check for any work. If the handler finds no work, the handler may call the "ContinueSleepWithRegisterSetsAndHandler" instruction 370 that may put the processor back to sleep (element 390), whereupon the processor may later wake up again, maintaining the same handler pointer and register sets. If the Handler finds that there may be work, the handler may execute "RestoreAndReturn" instruction 380 which restores full processor state and returns (340) to program 300 immediately after "Sleep WithRegisterSetAndHandler" instruction 310, as if the wakeup process had proceeded directly to this point.

As mentioned earlier, some sleep states of a processor, such as a C6 sleep state, may not be directly accessible to the applications. Consequently, one or more embodiments may implement the "almost-stateless wakeup and sleep" mechanism by exposing the "SleepWithRegisterSetAndHandler", "RestoreAndReturn", and "Continue SleepWithRegisterSetsAndHandler" functions to user applications as OS system calls. One should note, however, that in various embodiments the OS may still be using the above described ISA implementations of the above instructions. In such embodiments, the OS may accept the register set and handler functions and take control of the processor. The OS may then call the handlers, restoring only the limited specified state, when waking the sleeping application.

In some embodiments, only state that has been modified is to be saved to a storage area, such as DRAM, non-volatile memory, or some other memory that is to retain stored information when power is removed from a processor or processor core. Similarly, in some embodiments, only state that is to actually be used is to be restored from the storage area. In one embodiment, this may be achieved by storing additional information about the state information, such as "metadata", to indicate registers or register portions that contain modified data, as well as indicate registers or portions thereof that have not been restored since a previous exit of a low-power mode. While some embodiments described may use metadata information for each register that is to be saved/restored, other embodiments may use metadata information associated with a group of registers or class of registers. The following will discuss two examples of on-demand register save and restores: on-demand save/restore of OS state, and on-demand register save/restore of application state. However, other embodiments may use other examples that achieve substantially the same function. Moreover, some embodiments may describe the use of "metadata" to generically refer to any information that is stored with, or otherwise associated with, processor or system state information, and that is used to describe or indicate properties of the state data, such as whether the state data has been modified. In one embodiment, metadata is a bit or group of bits stored within a register or group of registers to describe the data stored in the register. In other embodiments, the metadata may be bits stored in some other stricture to indicate some attribute of the state data.

As discussed earlier, processor state information may change relatively infrequently, depending upon the application of the processor. In one embodiment, if a low-power mode is entered, such as when an MWAIT instruction is performed, a storage structure that stores information while the processor is in a low-power state (generically referred to as "persistent storage"), such as persistent storage 170, may still contain state data from a prior low-power mode instance. Moreover, some of that state data may still reflect the current state of the processor. Consequently, that data may not need to be updated when the processor enters a future low power mode. To take advantage of this fact, in one embodiment, one bit of metadata is used to mark registers that have been modified since the last time MWAIT was executed, or some other low-power mode instruction. For example, in one embodiment, in which an MWAIT instruction is used to put a processor or core into a low-power mode, processor 160 may use metadata bits to mark registers 162 and 164, which may have changed upon initiation of the last MWAIT instruction. Whenever the processor executes the MWAIT instruction and stores a register to persistent storage, the processor may clear the modified metadata bits for the registers. In one embodiment, upon subsequent writes to the registers, other than restoration, the processor may set the bit of the affected register. When a future MWAIT is executed, the system may store registers marked with the modified metadata back from the processor to persistent storage. The state stored in the persistent storage may then match that stored in the registers of the processor, but the number of stores required to keep the actual states of the registers and the states saved in persistent storage synchronized may be reduced if only a subset of registers have been modified.

Similarly, in one embodiment, when a low-power mode is exited, only state data that may be reused may be restored to their respective registers. During operation, it may be difficult or impossible to predetermine which registers will be used in the future. However, restoration of state registers may be deferred, in one embodiment, until the state information stored in those registers is actually needed by the processor. In one embodiment, therefore, only a necessary set of state information need be restored to the processor when exiting a low power mode. In one embodiment, the necessary state information may include a "load instruction pointer" (LIP) and some micro-architectural state information, such as information stored in a group of general purpose registers. A second metadata bit may be used to mark all other registers as "not restored", in one embodiment. In one embodiment, all registers to be read may have their "not restored" metadata bits cleared. If a "not restored" bit for a particular register is not cleared, meaning the value of the register has changed but not been restored, operation may be suspended and the flow of execution directed to a handler (e.g., microcode handler) to restore the needed state information from persistent storage, and to mark the metadata bit as "restored" so future accesses of the register do not re-restore the state information from persistent storage.

In some embodiments, frequent handler calls on a register-by-register basis may not be the most efficient technique to invoke the handlers. In one embodiment, a program may use one or more prediction or speculation techniques to determine which registers should be restored to prevent frequent handler calls. In one embodiment, a conservative register specification technique may be used to identify dependent registers or register sets to be always restored upon exiting a low-power mode. For example, OS 115 may identify dependent register sets in some embodiments that are to always be restored when exiting a low-power mode. In other embodiments, static sets of dependent registers may be identified that are always restored when exiting a low-power mode. In further embodiments, classes of registers, such as MMX or XMM registers, may be identified to always be restored when exiting a low-power mode.

Some embodiments may use a technique similar to those described above to aid application context switches as well. In one embodiment, user-level "not restored" and "modified" metadata bits may be used in a similar manner as described above with regard to state information saved/restored when entering/exiting low-power modes. In one embodiment, each process, such as application 120 and application 125, may have state information needed by the process, which must be available after a context switch. The state may be maintained by OS 115, with OS 115 therefore being responsible for saving and restoring the process state information. Consequently, system 100 may have hardware or architectural support to expose the metadata of the applications to OS 115 through the ISA. In one embodiment, application metadata may be exposed to the OS via various privileged instructions. For example, in one embodiment, a "GetModifiedRegs" instruction may be used to return a bitmap of the user-level "modified" metadata bits to the OS. In one embodiment, a second instruction, such as a "SetAllNotRestoredMeta" instruction, may be used to set all user-level "not restored" metadata bits. The embodiment may further utilize a "RestoreRegister" instruction to load values for the OS managed persistent storage to the associated registers, clear the user-level "not restored" and "modified" bits, and set the "modified" OS-level bit.

Figure 4:
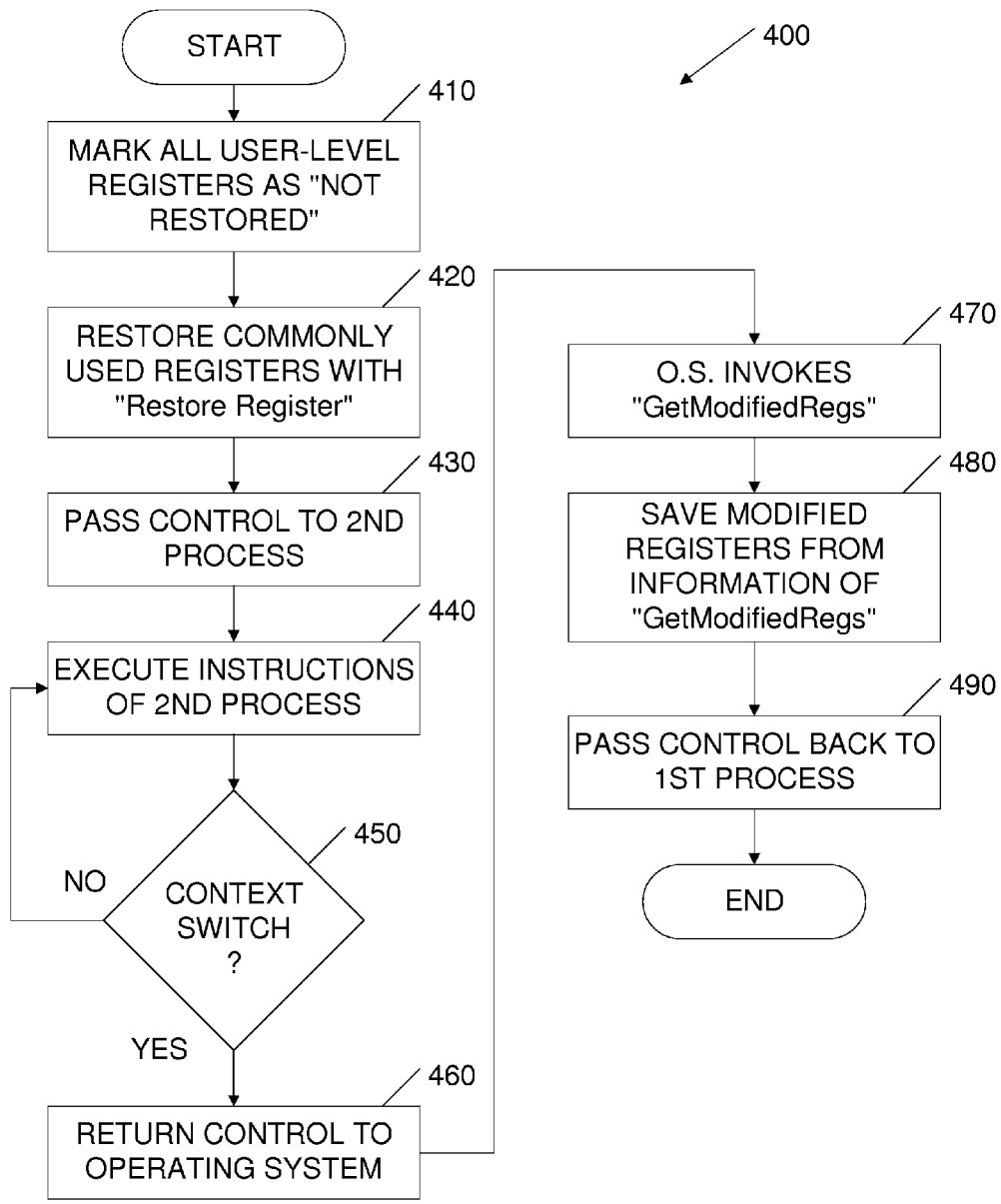
FIG. 4 depicts an algorithm, according to one embodiment, to save and restore register information on-demand.

To better understand how a system, such as system 100, may use these three privileged instructions to expose the metadata of the applications to OS 115, according to one embodiment, we may study the algorithm flowchart 400 depicted in FIG. 4. In one embodiment, OS 115 may use the "SetAllNotRestoredMeta" instruction to mark all user level registers as "not restored" (element 410). For example, when switching from application 125 to application 120, OS 115 may use the "SetAllNotRestoredMeta" instruction to mark registers 162 and 164, as well as register sets 166 and 168, as "not restored". OS 115 may then selectively restore the commonly used registers with the "RestoreRegister" instruction (element 420). Next, OS 115 may pass control from application 125 to application 120 (element 430). Hardware of processor 160 may check registers involved with read operations to ensure that the registers have been restored. For example, in executing instructions of application 120 (element 440), processor 160 may need to read register 164. Since register 164 has its metadata set to the "not restored" state, system 100 may cause application 120 to trap to OS 115. OS 115 may use the "RestoreRegister" to restore the previously saved value of register 164 and return to application 120 so that processor 160 may execute more instructions of application 120 (again element 440).

As noted before for a program utilizing the on-demand save and/or restore feature for OS state, because the performance and power costs of user-to-OS transitions may be relatively high, a system may need to exercise due care and caution when restoring appropriate registers at the beginning of the context switch. Also as noted before, register sets and register classes specified by an application may be used, or alternatively the OS may dynamically learn the common register sets and adapt the restoration of the OS accordingly.

In one embodiment, a processor may continue executing instructions of an application (element 440) until time to switch context to another application (element 450). For example, when an application returns control back to an OS (element 460), the OS may invoke the "GetModifiedRegs" instruction to determine which registers application 120 changed (element 470). Using the information returned from the "GetModifiedRegs" instruction, the OS may selectively update its records of the states of the registers (element 480), eliminating saves of unmodified registers. Upon updating it records for the register states, the system may pass control back to the first process (element 490).

Figure 5:
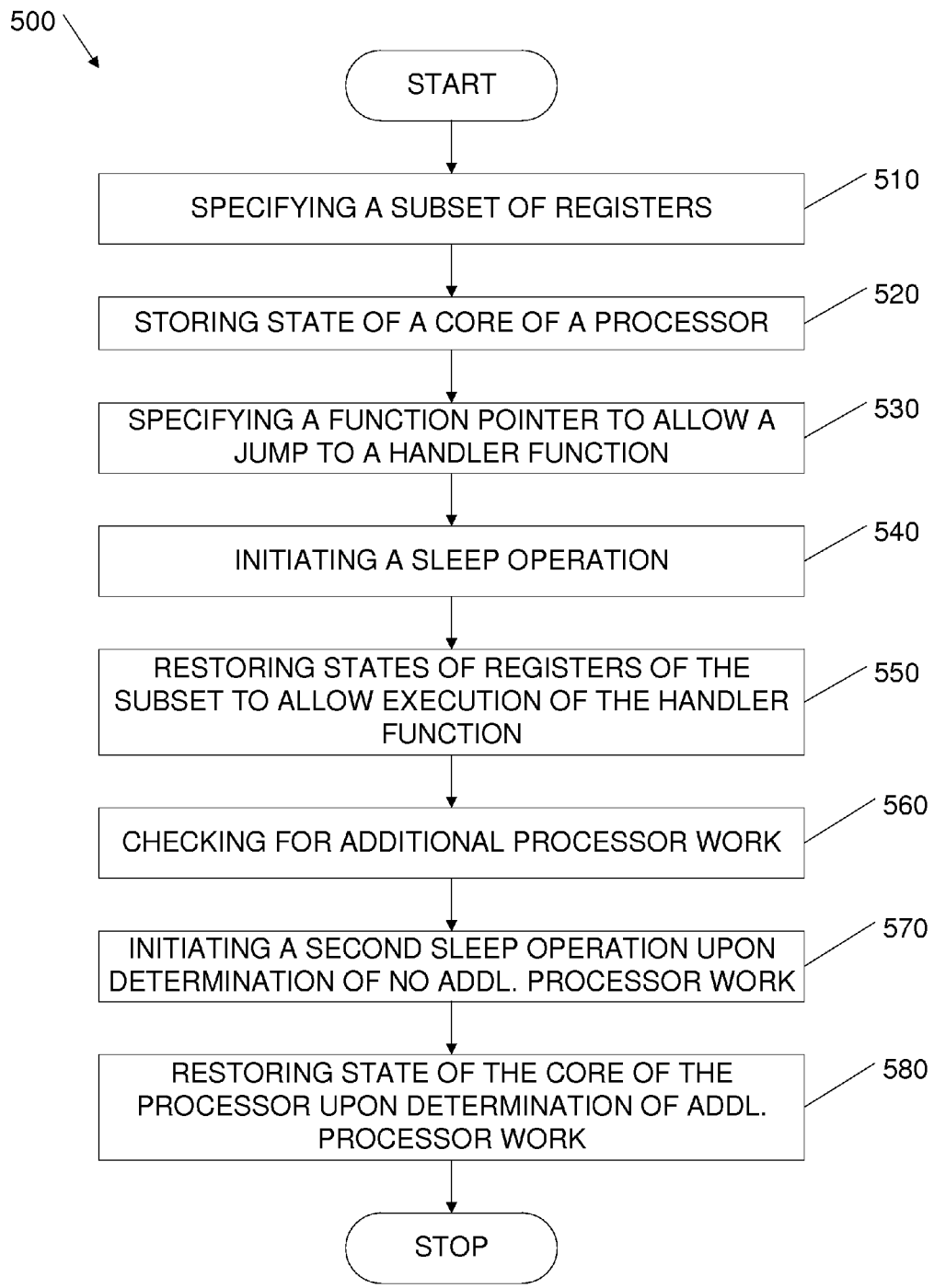
FIG. 5 illustrates a technique of reducing power consumption of an always on, always connected (AOAC) device, according to one embodiment.

FIG. 5 depicts a flowchart 500 illustrating a technique to reduce power consumption of an always on, always connected device, according to one embodiment. Flowchart 500 begins with specifying a subset of registers (element 510). For example, application 120 may specify registers to be involved in a register save or restore operation by specifying a register set or a register class, with the total number of registers to be involved in the register operation being far less than the total number of registers of processor 160. In the embodiment of FIG. 5, the device may specify the register set or register classes based upon the compiler-generated register set or class resulting from the compilation. In alternative embodiments, the device may specify the subset of registers using metadata bits.

An embodiment according to flowchart 500 may continue by storing state information of a core of a processor (element 520). For example, system 100 shown in FIG. 1 may store the states of registers 162 and 164 as well as the states of register sets 166 and 168, to persistent storage 170. In other words, registers 162 and 164 and the states of register sets 166 and 168 may comprise all the registers of "core 0" of processor 160. System 100 may save all states of the registers to persistent storage 170.

An embodiment according to flowchart 500 may continue by specifying a function pointer to allow a jump to a handler function (element 530). For example, processor 160 may execute a "SleepwithRegisterSetsAndHandler" instruction, providing an address which contains an instruction to be executed upon waking from a C6 sleep state. An embodiment according to flowchart 500 may continue by initiating the C6 sleep operation (element 540). Continuing with our previous example, after processor 160 has initiated the C6 sleep operation via the "Sleep WithRegisterSetsAndHandler" instruction and the contents of all of the registers for the core have been saved to persistent storage 170, the core may perform the necessary actions to transition system 100, more specifically to transition the affected core of system 100, into the C6 sleep. In alternative embodiments, the core may instead execute one or more instructions which place the core in a different state or a different mode, or execute other types of instructions. For example, the core may initiate or conclude an MWAIT operation or a context switch.

An embodiment may then restore states of the subset to allow execution of the handler function (element 550). For example, the specified subset of registers may have comprised only the necessary amount of registers to allow execution of the handler function specified with the "Sleep WithRegisterSetsAndHandler" instruction. In preparation for executing the handler, the core may restore the states of the subset of registers from persistent storage 170 (element 550). Upon restoration of the subset of registers, execution of code associated with the handler routine may allow the core to check for additional work (element 560). In alternative embodiments, the function of the handler routine may serve another purpose. For example, the function handler may allow the core to periodically process commands which may be pending, such as commands that may have accumulated in a command queue while the core was in the C6 sleep sate.

An embodiment according to flowchart 500 may continue by initiating another sleep operation upon determining that the processor core has no additional work which needs to be performed (element 570). Still continuing with our example, the core may initiate another sleep operation, which again may be a C6 sleep operation, upon determining that the core of the process has no additional work which needs to be performed. One embodiment according to flowchart 500 may repeatedly restore only the subset of registers (element 550), check for an additional work (element 560), and reinitiate the sleep mode when no additional work is present (element 570). Repeatedly performing these actions and involving only a subset of the total number of registers may allow a device to remain "always on, always connected" and check for additional work in a very low power mode. For example, the device may be part of a server computer that goes to sleep upon experiencing sparse network activity.

Upon detecting that additional work is present, one embodiment may continue by restoring state for the entire core of the processor (element 580). For example, system 100 may restore the states of registers 162 and 164, as well as the states of register sets 166 and 168, from persistent storage 170. Doing so may bring the core out of a C6 sleep mode and allow it to resume operation in another operational state, such as the C0 state. After executing a series of instructions, or after a period of operation, an embodiment may start the process over again at element 510 and re-enter the sleep mode. Additionally, depending on the embodiment, the associated apparatus may also enter another sleep mode, such as a C4 or a C5 sleep mode, along with another function handler routine. Using different routines, as well as minimal registers sets associated with each routine, may allow an apparatus to transition from one power state to another.

Another embodiment is implemented as a program product for reducing power consumption of processor standby operations in accordance with, e.g., system 100 as shown in FIG. 1. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the embodiments herein contemplate methods and apparatuses for reducing power consumption of processor standby operations. It is understood that the form of the embodiments shown and described in the detailed description and the drawings are to be taken merely as examples. It is intended that the following claims be interpreted broadly to embrace all the variations of the embodiments disclosed.

Although some aspects have been described in detail for some embodiments, it should be understood that various changes, substitutions and alterations can be made herein without departing from the spirit and scope of the embodiments as defined by the appended claims. Although one embodiment may achieve multiple objectives, not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the embodiments, processes, machines, manufacture, compositions of matter, means, methods, or steps, presently existing or later to be developed that perform substantially the same function or achieve substantially the same result as the corresponding embodiments described herein may be utilized according to the embodiments herein. Accordingly, the appended claims are intended to include within their scope such processes, machines, manufacture, compositions of matter, means, methods, or steps.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
 a fetch unit to fetch instructions;
 a decode unit to decode the fetched instructions;
 a plurality of execution units;
 a plurality of registers; and
 a control circuit to receive an instruction that specifies a subset of registers of the plurality of registers and a pointer to a handler function to be executed after the processor is awoken from a low-power mode to monitor for work to be performed by the processor, wherein the control circuit is to cause the subset of registers to be stored to a persistent storage prior to entry into the low-power mode, and after the processor is awoken from the low-power mode, to restore the subset of registers, jump to the handler function, and check for work to be performed.

2. The processor of claim 1, wherein, if no work is to be performed, the processor is to execute a second instruction that specifies the subset of registers and the pointer to store the subset of registers to the persistent storage and re-enter the low-power mode.

3. The processor of claim 2, wherein, if work is to be performed, the processor is to execute a third instruction to restore full processor state and return to an application.

4. The processor of claim 1, wherein the subset of registers corresponds to registers to be used by the handler function.

5. The processor of claim 4, wherein the subset of registers does not include registers of other reachable code.

6. The processor of claim 1, wherein the instruction that specifies the subset of registers comprises a bitmap to specify the subset of registers.

7. The processor of claim 1, wherein the subset of registers comprises a first class of registers, wherein the plurality of registers comprises a plurality of classes of registers.

8. The processor of claim 1, wherein the processor comprises the persistent storage.

9. The processor of claim 8, wherein the persistent storage comprises a cache memory.

10. The processor of claim 1, wherein the control circuit is to cause the subset of registers to be stored based on metadata of the subset of registers, the metadata comprising a modified indication and a not-restored indicator.

11. The processor of claim 1, wherein the subset of registers comprises registers to store values changed since a last low-power mode occurred.

12. The processor of claim 1, wherein the processor comprises a multicore processor, the control circuit to cause a first core to enter the low-power mode while a second core is to be maintained in an active state.

13. The processor of claim 12, further comprising a cache memory to maintain data associated with the first core when the first core is in the low-power mode.

14. A non-transitory machine-readable medium having stored thereon instructions, which if performed by a machine cause the machine to perform a method comprising:
receiving, in a first instruction, an identification of a subset of registers to be saved during a transition of a processor from an active state to a low-power mode and an identification of a function pointer to a handler function to be executed after exit from the low-power mode;
responsive to the first instruction, storing the subset of registers to a persistent storage of the processor and entering the low-power mode; and
after waking from the low-power mode, restoring the subset of registers from the persistent storage, and entering an operating mode of the processor.

15. The non-transitory machine-readable medium of claim 14, wherein the method further comprises, if no work is to be performed after the exit from the low-power mode, executing a second instruction that identifies the subset of registers and the function pointer to store the subset of registers to the persistent storage and re-entering the low-power mode, and wherein, if work is to be performed, executing a third instruction to restore full processor state and return to an application.

16. A system comprising:
a processor having a plurality of cores, a cache memory, and a control circuit to receive an instruction that specifies a subset of registers of a plurality of registers to be stored during a transition of a first core of the plurality of cores from an active state to an inactive state, the instruction further to specify a pointer to a handler function to be executed after exit of the first core from the inactive state, wherein the control circuit is to cause the subset of registers to be stored to the cache memory prior to entry of the first core into the inactive state, and to restore the subset of registers, jump to the handler function, and monitor for work to be performed by the first core after the exit of the first core from the inactive state; and
a dynamic random access memory (DRAM) coupled to the processor.

17. The system of claim 16, wherein the control circuit is to cause the subset of registers to be stored based on metadata of the subset of registers, wherein the metadata comprises a modified indication and a not-restored indicator.

18. The system of claim 16, wherein, if no work is to be performed, the first core is to execute a second instruction that specifies the subset of registers and the pointer to store the subset of registers to the cache memory and re-enter the inactive state, and, if work is to be performed, the first core is to execute a third instruction to restore full processor state and return to an application.

19. The system of claim 16, wherein the instruction comprises a sleep-with-register-set-and-handler instruction of an instruction set architecture (ISA).

* * * * *